(12) United States Patent
Watson

(10) Patent No.: US 7,801,694 B1
(45) Date of Patent: Sep. 21, 2010

(54) GYROSCOPE WITH TEMPERATURE COMPENSATION

(75) Inventor: William S. Watson, Eau Claire, WI (US)

(73) Assignee: Watson Industries, Inc., Eau Claire, WI (US)

( * ) Notice: Subject to any disclaimer, the term of this patent is extended or adjusted under 35 U.S.C. 154(b) by 99 days.

(21) Appl. No.: 12/240,960

(22) Filed: Sep. 29, 2008

Related U.S. Application Data

(60) Provisional application No. 60/975,629, filed on Sep. 27, 2007.

(51) Int. Cl.
*G01C 19/00* (2006.01)
*G06F 19/00* (2006.01)

(52) U.S. Cl. .......................................... 702/104; 702/99

(58) Field of Classification Search ................. 702/104, 702/106, 99; 73/1.38, 1.77, 504.12
See application file for complete search history.

(56) References Cited

U.S. PATENT DOCUMENTS

| | | | |
|---|---|---|---|
| 5,481,913 A | 1/1996 | Ito et al. | |
| 5,712,427 A | 1/1998 | Matthews | |
| 5,987,984 A | 11/1999 | Artzner et al. | |
| 6,343,509 B1 | 2/2002 | Fell et al. | |
| 6,577,952 B2 | 6/2003 | Geier et al. | |
| 6,859,113 B2 | 2/2005 | Giousouf et al. | |
| 7,120,548 B2 | 10/2006 | Malvern et al. | |
| 7,224,236 B2 | 5/2007 | Partridge et al. | |
| 7,240,533 B2 * | 7/2007 | Fell et al. ...................... 73/1.38 |
| 7,617,727 B2 * | 11/2009 | Watson .................... 73/504.13 |
| 2002/0100322 A1 | 8/2002 | Ebara et al. | |
| 2002/0165687 A1 | 11/2002 | Goto et al. | |
| 2007/0256495 A1 | 11/2007 | Watson | |

FOREIGN PATENT DOCUMENTS

| | | |
|---|---|---|
| EP | 0 592 171 A1 | 4/1994 |
| EP | 1 052 478 A2 | 11/2000 |
| GB | 2 327 265 A | 1/1999 |

* cited by examiner

*Primary Examiner*—Bryan Bui
(74) *Attorney, Agent, or Firm*—Patterson Thuente Christensen Pedersen, P.A.

(57) ABSTRACT

A method for compensating for bias and scale factor errors in vibrating structure gyroscopes. Certain embodiments utilize the functional relationship that bias and scale factor errors have with resonant frequency of vibration in the main vibrating body. Other embodiments utilize the functional relationships that other drive parameters of vibrating structure gyroscopes, such as drive voltage, have with bias and scale factor errors. The various methods may be used repeatedly during normal gyroscope operation in order to continually compensate for the bias and scale factor errors.

20 Claims, 6 Drawing Sheets

GYROSCOPE WITH TEMPERATURE COMPENSATION

RELATED APPLICATIONS

The present application claims the benefit of U.S. Provisional Application No. 60/975,629, filed Sep. 27, 2007, which is incorporated by reference herein in its entirety.

FIELD OF THE INVENTION

The present disclosure relates generally to instruments and methods for determination of rate of rotation. More specifically this disclosure relates to methods for temperature compensation in angular-rate gyroscopes.

BACKGROUND OF INVENTION

Gyroscopes have found application in the sensing of angular rotation rate. The design and packaging of gyroscopes has evolved as new applications for their rate-sensing capabilities have been realized. For instance, gyroscopes have been utilized in airplane navigation systems, weapon navigation systems, and boat stabilization systems. More recently, gyroscopes have been utilized in applications such as stabilizing a camera lens and in providing real time feedback for interactive game consoles indicating when a control device has been moved.

Inertial rate gyroscopes include vibrating elements referred to herein as "gyro resonators." These gyro resonators may take on one of many forms, including tuning fork, cylinder and planar ring structures. Many inertial rate gyroscopes utilize Coriolis forces to detect the angular rate of rotation of the gyro resonator about a sensitive axis. Inertial rate gyroscopes may be constructed from a variety of materials, including but not limited to piezoelectric, ceramic and quartz.

In some applications (e.g. aeronautics), the gyroscope may be subject to a range of operating temperatures. Temperature may affect the vibrational characteristics of the resonating element, which in turn may cause a change in the zero bias and scale factor of the gyroscope. The changes in bias and scale factor are herein collectively referred to as "temperature drift" which may be manifested as an error in the detected magnitude of angular rotation.

One solution for handling temperature drift is to utilize a temperature sensing device such as a thermistor or thermocouple that senses the temperature of the gyro resonator. Knowing the temperature of the gyro resonator enables some correction of the effects of temperature drift. Unfortunately, the temperature sensing device may significantly lead or lag the change in temperature of the gyro resonator, causing a transient error in the temperature determination. Moreover, the presence and configuration of the temperature sensing device may load the temperature measurement in a way that cannot be simulated during calibration, leading to a potential for steady state error in the temperature determination. Such transient and steady state errors in the temperature determination may lead to insufficient precision in the detection of rotational rates.

Installation of the temperature measuring device into the gyroscope assembly may increase the complexity and quality assurance requirements in the manufacture of the gyro resonator. For instance, the welds of the thermistor mounts may require inspection and testing to ensure connectivity to the resonating body for temperature detection. Even welds of highest quality may introduce asymmetries in the structure that affect the propagation of the vibration pattern of the gyro resonator in operation. The heightened complexity and quality assurance requirements may increase costs and reduce manufacturing output.

For silicon ring gyro resonators, the technique of inferring temperature from the resonant frequency of the gyro resonator, as well as from secondary indicia such as drive voltage level and quadrature sense signal level, is known. U.S. Pat. No. 7,120,548 to Malvern et al. (Malvern) discloses a method for implementing bias and scale factor corrections utilizing measurements of the resonant frequency from the silicon ring resonator. The technique is disclosed as being applicable to silicon ring gyro resonators having a substantially linear variation in resonant frequency with temperature of −0.4 Hz/Celsius in the vicinity of −40 Celsius. Such an approach eliminates the need for installation of the temperature measuring device and attendant quality assurance complexities.

However, the use of a silicon ring gyro resonator does not eliminate the effects of lead or lag in the sensing of temperature. The gyro resonator of a silicon ring gyroscope comprises a continuous silicon ring suspended from a support structure on thin silicon filaments. Drive and sense components, typically magnetic or capacitive in nature, are operatively coupled to the filaments and ring. In steady state operation, the temperature of the silicon ring is typically is elevated from the magnetic or capacitive drive/sense components due to flexure heating (i.e. dissipation of vibrational energy). The magnetic or capacitive drive/sense components respond more quickly to external temperature changes because they are more closely coupled to the external case of the gyroscope package than the silicon ring, which is isolated by the thin silicon filaments. Accordingly, with silicon ring resonators, there often remains a lead or lag in the ring temperature with respect to the magnetic or capacitive drive/sense components in response to external temperature changes. Malvern characterizes this lead or lag as an "apparent hysteresis" in the time domain. Malvern further discloses a method for correction that implements a power series expansion utilizing the resonant frequency of the gyro resonator, the drive voltage required to maintain a fixed vibration amplitude at the antinode of the oscillation pattern, and quadrature sense signal levels to correct for the effects of lead or lag on the bias.

In addition, many silicon ring gyro resonators have limited life cycles and durability issues. While the ring and filaments are made of silicon, the support structure is typically a composite structure of a glass or quartz material. As such, silicon ring gyro resonators are prone to failure due to delamination between the silicon and the glass or other dissimilar components. Fatigue of the thin silicon filaments is also a frequent mode of failure.

A device and method that can effectively compensate for the bias and scale factor errors associated with temperature drift while reducing the complexities associated with sensing the temperature of the gyro resonator in a more durable configuration would be welcome.

SUMMARY OF THE INVENTION

Various embodiments of the invention are presented that include a monolithic vibrating structure such as a piezoelectric resonator and that utilizes the temperature dependency of the resonant frequency of the resonator to determine the temperature of the resonator. The use of monolithic vibrating structures can improve reliability and durability of the gyro resonator because they are not composite structures. Some embodiments of the invention utilize changes in attendant operating characteristics of the gyro resonator other than resonant frequency, such as drive signal, to correlate with and compensate for the temperature drift of the gyroscope. Certain embodiments further utilize alternative configurations other than the ring gyro resonator, such as a cup (cylindrical or hemispherical) or fork geometry that are less prone to lead or lag between the resonator and the drive and/or sense components in response to external temperature changes. Accordingly, the various embodiments of the invention can eliminate or reduce the vagrancies associated with silicon ring gyro resonators.

Much of the present disclosure is directed to piezoelectric gyro resonators. Piezoelectric resonators are in some instances preferred because they offer a monolithic alternative to silicon ring gyro resonators, thus avoiding the problems of delamination associated with silicon ring gyro resonators. Furthermore, it has been discovered that the power series expansion technique of Malvern, as described above, does not account for changes in the scale factor due to the thermal lead or lag. Certain piezoelectric resonator geometries, for example the piezoelectric cup, can be constructed so that all of the operating components are mounted on the resonating element itself. In this way, the magnitude of the lead or lag between the resonating element and the drive or sense components can be greatly reduced relative to the silicon ring gyro resonator. In addition, the sensing elements in piezoelectric resonators may also be more closely and firmly coupled to the resonator at or near the resonance node for improved shock and vibration rejection. This is in contrast to the use of flexible filaments used to soft mount silicon ring structures.

The use of piezoelectric gyro resonators pose unique challenges to inferring temperature from the operating characteristics. One notable difference is a substantially greater sensitivity of the scale factor to temperature change vis-à-vis silicon ring gyro resonators. For example, the scale factor of some silicon ring gyro resonators are known to vary less than ±1.5% over the range from −40 to +80 Celsius, or a change of only ±0.0125% per Celsius. Piezoelectric resonators, on the other hand, are known to vary greater than 10% over the range from just +20 to +80 Celsius, for a change of 0.17% per Celsius, which is greater than a ten-fold increase.

Furthermore, while the variation in both the bias and the scale factor with temperature are generally linear for silicon ring gyro resonators, the temperature dependency of the bias and scale factors of piezoelectric gyro resonators can be substantially non-linear. Unlike silicon ring gyro resonators which comprise a homogenous, single crystalline resonating structure, a piezoelectric ceramic resonator may be comprised of a sintered polycrystalline material. The different elements in the polycrystalline structure generally have differing thermal expansion coefficients, as well as differing directionality in the thermal expansion. As a result, piezoelectric gyro resonators are typically characterized as having non-linear operational properties, unlike their silicon counterparts. For example, the resonant frequency vs. temperature relationship, which is generally linear for silicon-based resonators, is substantially non-linear for piezoelectric resonators.

Also unlike silicon ring gyro resonators, the power required to maintain a piezoelectric gyro resonator at a fixed vibration amplitude at the antinode of the oscillation pattern may be substantially non-linear. Moreover, the temperature represented by a given power parameter such as drive voltage may be non-unique in some instances. That is, a given power metric (e.g. drive voltage, current or impedance) could be indicative of more than one operating temperature across certain ranges.

Ways to overcome these challenges are presented in the ensuing portions of the disclosure.

DETAILED DESCRIPTION

Figure 1A:
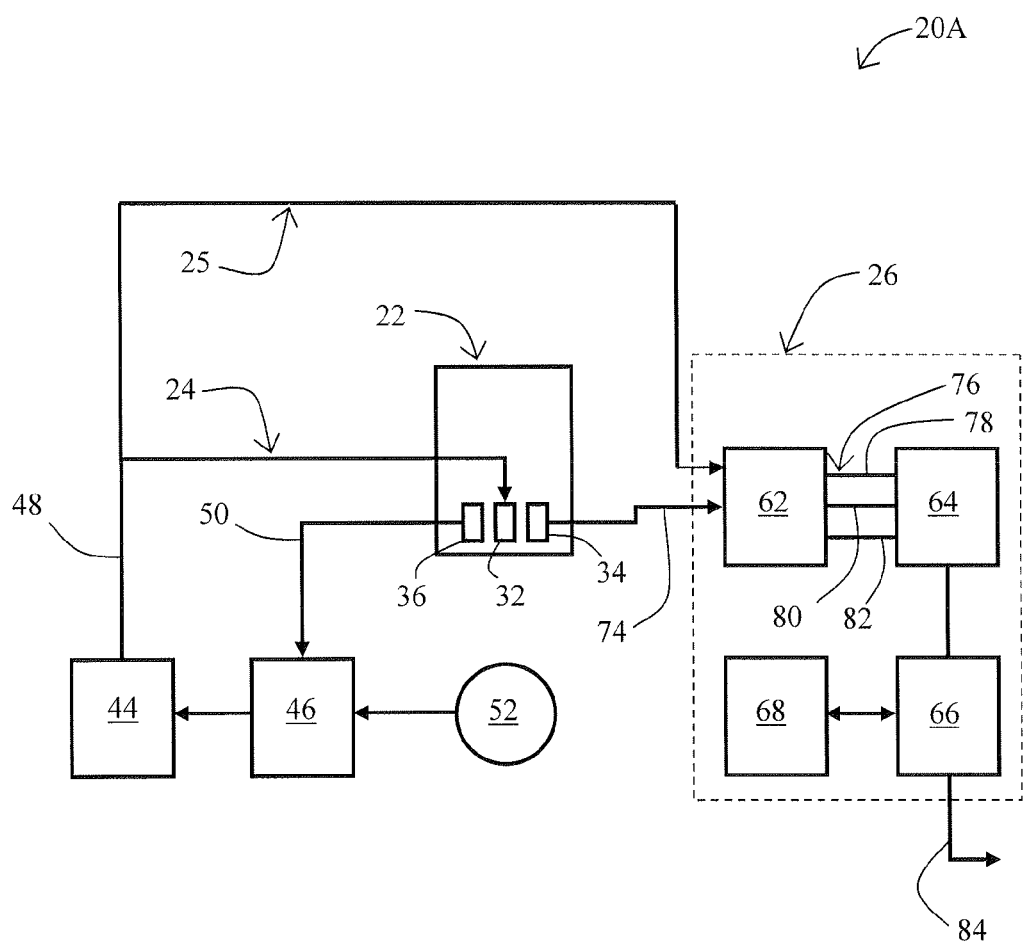
FIG. 1A is a schematic of a representative inertial rate gyroscope and control system in a first embodiment of the invention.
Figure 1B:
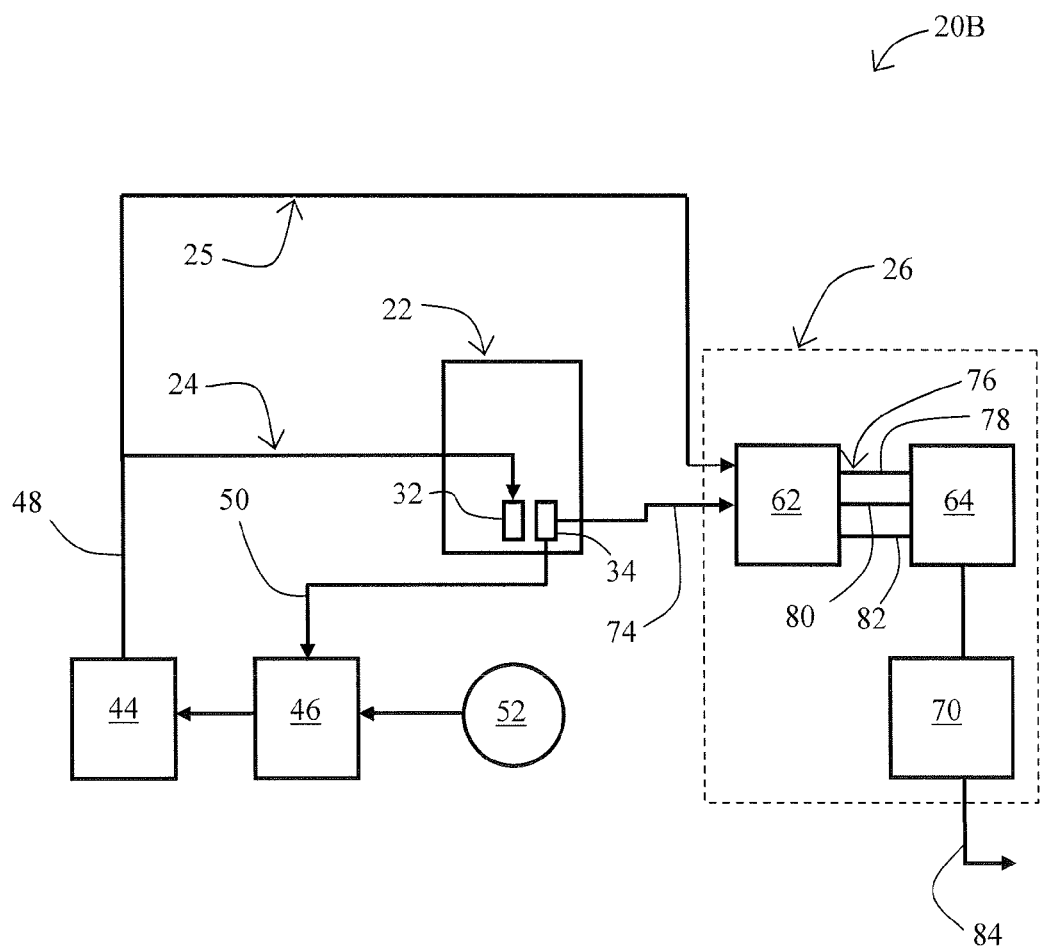
FIG. 1B is a schematic of a representative inertial rate gyroscope and control system in a second embodiment of the invention.

Referring to FIGS. 1A and 1B, a gyroscope system 20A or 20B is depicted in an embodiment of the invention. The gyroscope system 20A may include a piezoelectric gyro resonator 22, a drive control loop 24, a phase reference connection 25 for demodulating the rotation rate signal, and an output processor 26. The piezoelectric gyro resonator 22 may include at least one drive element 32 for generating a vibration pattern on the piezoelectric gyro resonator 22 and at least one sensing element 34 positioned on the piezoelectric gyro resonator 22 at a location of the node of the vibration pattern for detecting a minimum or near-minimum signal when the piezoelectric gyro resonator 22 is being driven (vibrated) but is rotationally at rest.

The gyroscope system 20A may further include a dedicated feedback element 36 (as depicted) that is substantially distanced from any node locations of the at-rest vibration pattern for detection of the amplitude of the oscillation pattern. The drive control loop 24 may include a drive source 44 such as a voltage source or drive amplifier that is controlled by a controller 46 to output a drive signal 48 to the drive element(s) 32. The controller 46 may include digitally controlled potentiometers, an automatic gain control (AGC) amplifier and/or a phase locked loop for altering the drive signal 48.

The dedicated feedback element 36, when implemented, can provide a control feedback signal 50 to the controller 46 having a set point 52. The set point 52 may be the reference level for a controller that implements an AGC amplifier. It is noted that the magnitude of the drive signal 48 required to maintain the feedback signal 50 at the set point 52 generally depends on the temperature of the piezoelectric gyro resonator 22, as described below in more detail.

The gyroscope system 20B of FIG. 1B may include many of the same components as described for the gyroscope system 20A of FIG. 1A. However, the sensing elements 34 may comprise the feedback element that generates the control feedback signal 50. The sensing elements 34 in this embodiment may be proximate to but not directly at the node locations of the at-rest vibration pattern in an arrangement that senses a component of the amplitude of the vibration of the piezoelectric gyro resonator 22. Such sensing elements 34 are arranged so that they sense both the drive amplitude and the rotation rate of the piezoelectric gyro resonator 22, thus negating the need for a "dedicated" feedback element. Examples of such an embodiment are disclosed in co-pending U.S. Patent Application Publication No. 2007/0256495 to Watson, assigned to the assignee of the instant application, the disclosure of which is hereby incorporated by reference herein except for express definitions contained therein. Such embodiments may eliminate the need for a dedicated feedback element 36.

The output processor 26 of the gyroscope system 20A may include a signal conditioner 62, an analog-to-digital (A/D) converter 64, a microprocessor 66, and an electronic data storage medium 68. In the depicted embodiment, the signal conditioner 62 is operatively coupled with an analog output or outputs 74 from the sensing element(s) 34 to output a conditioned signal or signals 76. The drive signal 48 may also be in communication with the signal conditioner 62. The conditioned signals 76 may provide an amplitude output or outputs 78 of the vibration sensed by the sensing element(s) 34 and a resonant frequency output 80 of the piezoelectric gyro resonator 22, as well as an indication of the magnitude of the drive signal 82. The conditioned signals 76 may be routed to the A/D converter 64 for digitization and subsequent processing by the microprocessor 66. The microprocessor 66 may access the electronic data storage medium 68 to convert the digitized data into a rotation rate 84. Alternatively, the output processor 26 may incorporate circuitry 70 such as an application specific integrated circuit (ASIC) or a field programmable gate array (FPGA) operatively coupled to the A/D converter (FIG. 1B).

The phase reference connection 25, which is taken from the drive signal 48, provides an indication of the magnitude (e.g., voltage) of drive signal. The phase reference connection 25 may also carry a waveform to the signal conditioner 62 that has the same frequency as the resonant frequency of the piezoelectric gyro resonator 22. Hence, either of the phase reference connection 25 or the analog output or outputs 74 from the sensing element(s) 34 can provide an indication of the magnitude of the drive signal 48 as well as the resonant frequency of the piezoelectric gyro resonator 22.

The piezoelectric gyro resonator 22 may be configured in one of a variety of gyro resonators, including but not limited to a tuning fork resonator, a triangular prism resonator or a cylindrical or cup resonator. It is further understood that the drive control loop 24 and the output processor 26 may be located proximate the piezoelectric gyro resonator 22 to provide a unitary or compact assembly.

In operation, the drive signal 48 when applied to the drive element(s) 32 causes the piezoelectric gyro resonator 22 to vibrate at a resonant frequency. In certain embodiments (e.g., FIG. 1A), the dedicated feedback element 36 picks up the magnitude of the vibration for feedback to the controller 46. In other embodiments (e.g., FIG. 1B), the drive sensing element 34 picks up the magnitude of the vibration for feedback to the controller 46. In either case, the controller 46 may be utilized to adjust the drive signal 48 output by the drive source 44 so that the magnitude of the vibration as communicated by the feedback signal 50 is controlled to within an acceptable tolerance of a set point 52.

Vibration of the gyro resonator 22 generally causes the sensing element(s) 34 to output a substantially sinusoidal signal at the resonant frequency and characterized by an amplitude. The resonant frequency and amplitude of the sinusoidal signal may be isolated by the signal conditioner 62 before being digitized by the A/D converter 64 (FIG. 1A).

The resonant frequency of the piezoelectric gyro resonator 22 can be generally temperature dependent, as will be described below. The ensuing discussion is directed to piezoelectric gyro resonators of the various configurations limned above (e.g. a tuning fork, triangular prism, cylindrical cup or hemispherical cup). However, it is noted that the techniques described herein are generally applicable to gyro resonators that exhibit non-linear, temperature dependent characteristics.

Figure 2:
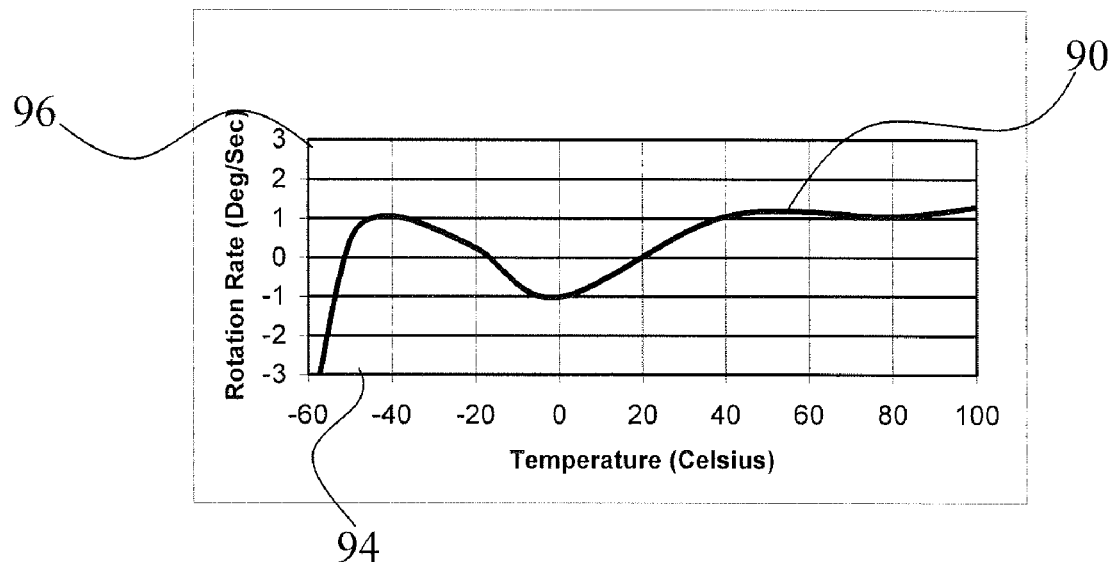
FIG. 2 is a representative rotational rate bias versus temperature graph in an embodiment of the invention.
Figure 3:
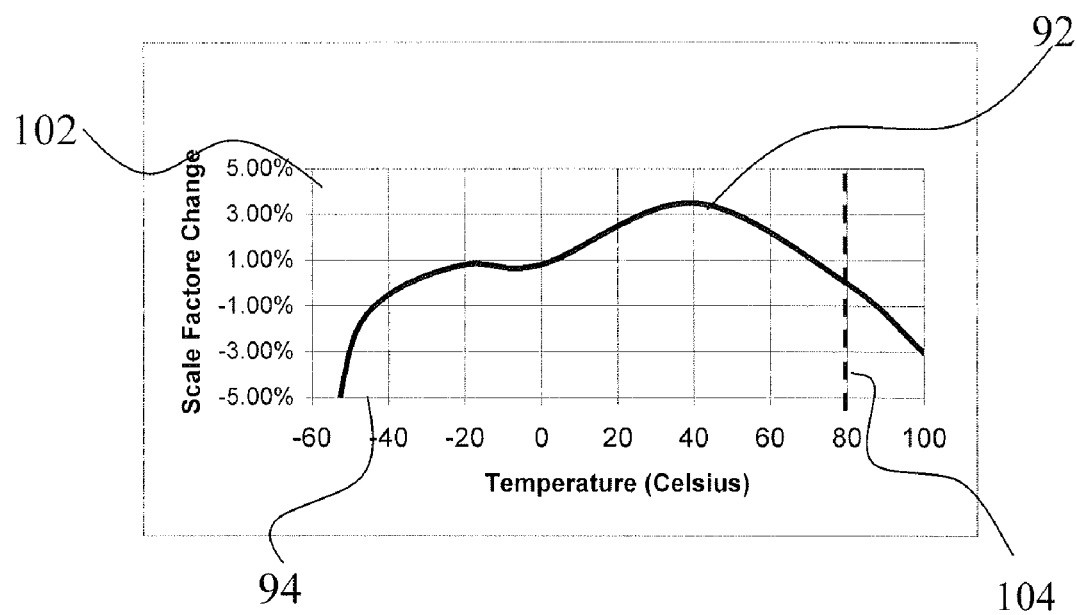
FIG. 3 is a representative scale factor change versus temperature graph in an embodiment of the invention.

Referring to FIGS. 2 and 3, respective examples of a temperature vs. an error function such as a bias function or relationship 90 (FIG. 2) or a scale factor function or relationship 92 (FIG. 3) are graphed versus temperature 94 for the piezoelectric gyro resonator 22 in the embodiment of FIGS. 1A and 1B. For purposes of this application, "temperature bias" is defined as the effect that temperature has on the measured voltage when the gyroscope is not rotating about its sensitive axis. The "scale factor" as used herein is defined as the constant of proportionality between the actual gyroscope rotation rate about its sensitive axis and the output signal of the gyroscope. The temperature vs. bias relationship 90 may be presented in terms of a false rotation rate or rotation rate bias 96 versus an operating temperature 94, as depicted in FIG. 2. The scale factor may be presented in terms of a percent change in the scale factor 102 relative to a calibration reference temperature 104 versus the operating temperature 94, as depicted in FIG. 3.

Functionally, the temperature vs. bias relationship 90 of FIG. 2 illustrates that the rotation rate bias 96 may generate a false component of rotation that adds to or subtracts from the true rotation rate as the temperature 94 changes or shifts away from the temperature of calibration. The temperature dependency of the temperature vs. scale factor relationship 92 illustrates that the proportionality of a signal from the piezoelectric gyro resonator 22 may also change with temperature, thus affecting the slope or gain of a given calibration curve.

Figure 4:
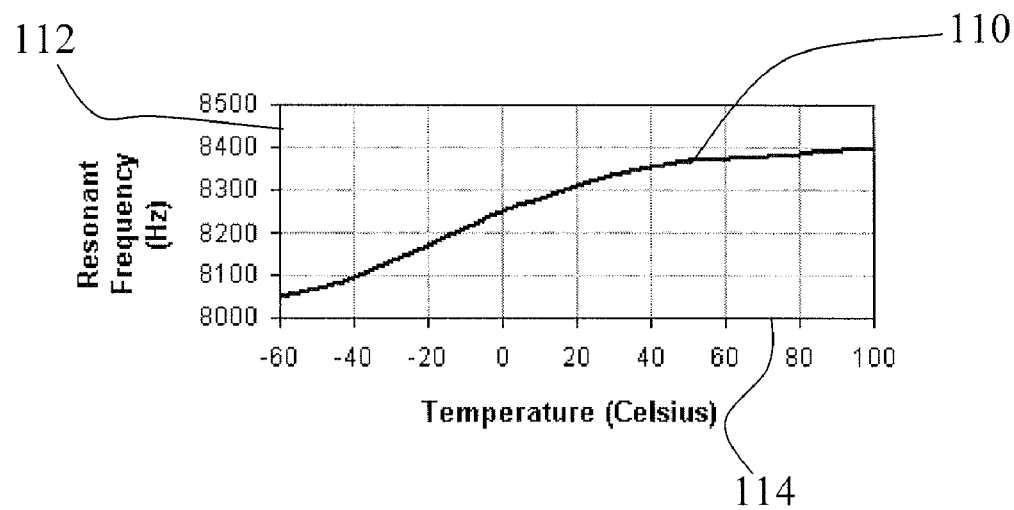
FIG. 4 is a representative resonant frequency of oscillation of a vibrating gyroscope versus temperature graph in an embodiment of the invention.

Referring to FIG. 4, an example resonant frequency vs. temperature function or relationship 110 for the piezoelectric gyro resonator 22 is illustrated in an embodiment of the invention. A resonant frequency 112 of the piezoelectric gyro resonator 22 is presented over a range of temperatures 114. The temperature dependency of the resonant frequency 112 may be caused by changes in the material stiffness, thermal stresses and/or dimensional changes of the gyro resonator 22. The functional relationship 110 between the resonant frequency 112 and the temperature 114 of the piezoelectric gyro resonator 22 may be established through a calibration process.

Figure 5:
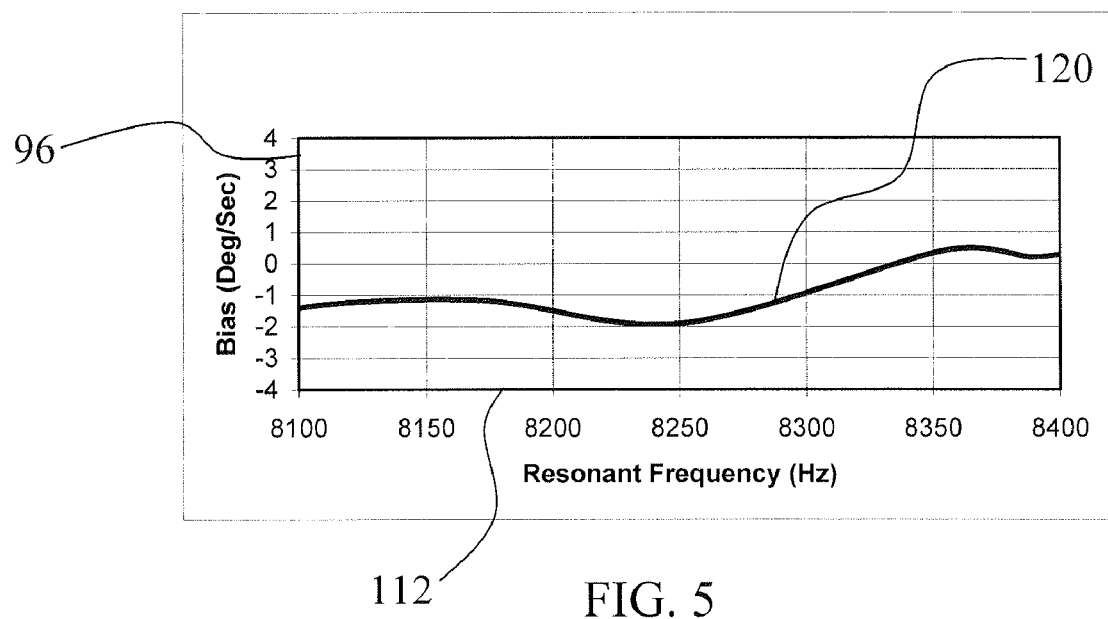
FIG. 5 is a representative bias error versus resonant frequency graph in an embodiment of the invention.
Figure 6:
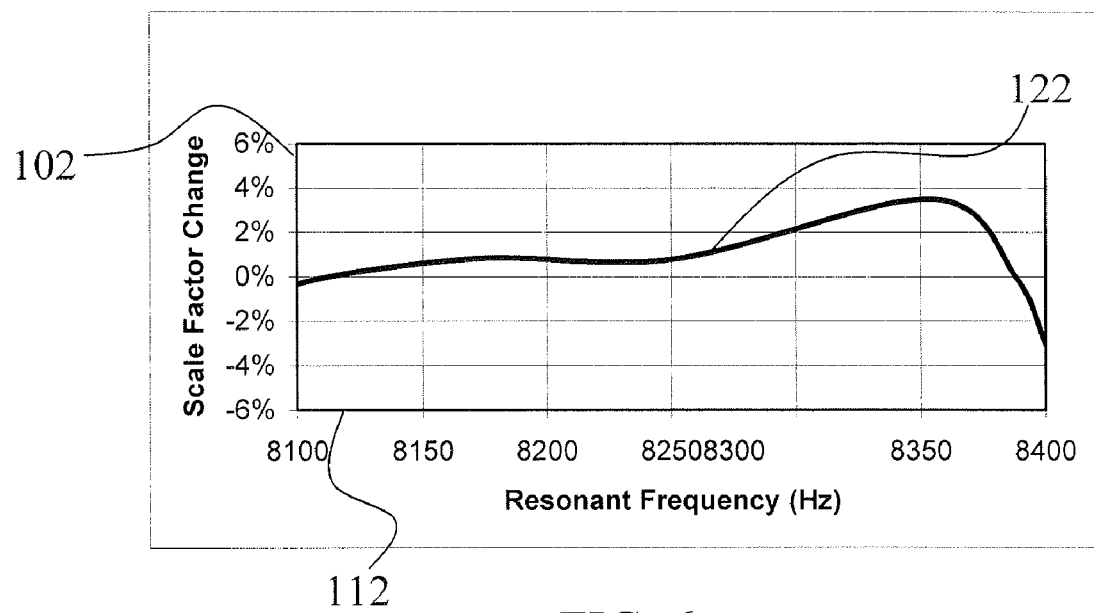
FIG. 6 is a representative scale factor change versus resonant frequency graph in an embodiment of the invention.

Referring to FIGS. 5 and 6, respective examples of a resonant frequency vs. bias relationship 120 and a resonant frequency vs. scale factor relationship 122 are presented in an embodiment of the invention. The relationships 120 and 122 may be obtained by transforming the temperature vs. bias relationship 90 and the temperature vs. scale factor relationship 92 functional relationships of FIGS. 2 and 3 into functions of resonant frequency 112. Alternatively, the frequency, bias and scale factor error functions could be recorded directly in the process of temperature testing. In one embodiment, the temperature vs. resonant frequency relationship 110 of FIG. 4 is utilized to assign or map the resonant frequency 112 to each temperature 94 of FIGS. 2 and 3. In the depiction of FIG. 4, the mapping provides a unique resonant frequency for each temperature. The mapping enables transformation of the resonant frequency 112 as an indication of the rotation rate bias 96 (FIG. 5) and the change in the rotation rate 102 (FIG. 6).

The technique of mapping and transformation from the temperature domain to the frequency domain can be useful in situations where the temperature dependent relationships 90, 92 and 110 are obtained independently. For example, for systems that implement previously known temperature correction techniques may already possess calibration data from which the temperature vs. bias relationship 90 and the temperature vs. scale factor relationship 92 can be defined. One could then acquire temperature vs. resonant frequency data via calibration to construct the temperature vs. resonant frequency relationship 110, implementing the transformation to the resonant frequency vs. bias relationship 120 and the resonant frequency vs. scale factor relationship 122 thereafter. In other instances, the temperature dependent characteristics of all the key parameters (resonant frequency, bias and scale factor) for a given gyro resonator may be available from prior calibrations.

Alternatively, the resonant frequency vs. bias relationship 120 and the resonant frequency vs. scale factor relationship 122 can be obtained directly by calibration, thus eliminating the need for the foregoing mapping and transformation. The calibration comprises measuring the resonant frequency, bias and scale factors of the piezoelectric gyro resonator 22 over a series of substantially steady state temperatures. The data thus obtained can be utilized to construct the relationships 120 and 122 directly.

In operation, the resonant frequency 112 of the subject piezoelectric gyro resonator (e.g. piezoelectric gyro resonator of FIGS. 1A and 1B) may be utilized to infer the attendant bias 96 and the scale factor 102 from FIGS. 5 and 6, respectively, as well as the representative temperature 114 of the gyro resonator from FIG. 4. In the example gyroscope system 20B of FIG. 1B, the resonant frequency 112 is sensed by the sensing elements 34. Ergo, this approach enables inference of the bias 96, scale factor 102 and representative temperature 114 without resort to a temperature sensor or other additional components. The need for additional quality assurance attendant to the installation of a separate temperature sensor is thereby eliminated. Furthermore, utilizing the resonant frequency 112 as a measure of operating temperature may reduce the lag between the measured temperature and the actual temperature of the piezoelectric gyro resonator 22, thus enhancing the performance of the gyroscope.

The electronic data storage medium 68 (FIG. 1A) may provide calibration data to the microprocessor 66 for converting the digitized signals to the rotation rate 84. The calibration data may be in the form of a lookup table, a polynomial expansion, or other forms suitable for implementation with conversion techniques known to the artisan. The electronic data storage medium 68 may also contain instructions executable by the microprocessor for implementing the calibration data (e.g. lookup table and/or polynomial expansion algorithms) to execute the various bias and scale factor corrections outlined above, based on the various outputs 78, 80 and 82. In embodiments implementing circuitry 70 such as an ASIC or an FPGA (FIG. 1B), the circuitry 70 may be adapted to be configured to implement these functions.

In some embodiments, the analog outputs 74 from the sensing element(s) 34 may be treated with analog conditioning electronics (not depicted) for conversion the analog outputs 74 into a rotation rate, including the correction of the temperature drift effects.

Figure 7:
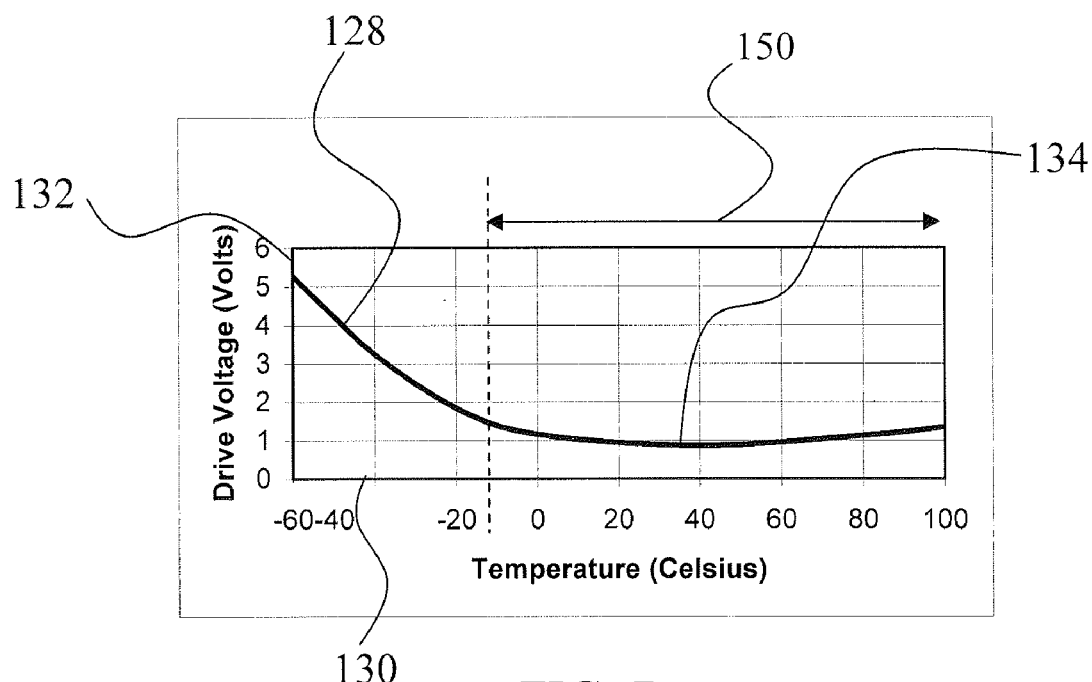
FIG. 7 is a representative drive voltage versus temperature graph in an embodiment of the invention.

Referring to FIG. 7, a drive function 128 of the magnitude of a drive voltage 132 corresponding to the drive signal 48 required to maintain the amplitude of the vibration of the piezoelectric gyro resonator 22 at the set point 52 over a range of temperatures 130 is illustrated. The changing characteristic of the drive function 128 as the temperature 130 changes is believed to be the result of changing electromechanical properties of the piezoelectric gyro resonator 22. As a result, a functional relationship between the drive voltage 132 and temperature 130 of the piezoelectric gyro resonator 22 may be created through known calibration processes.

In operation, establishment of the drive function 128 versus temperature 130 may enable the temperature of the piezoelectric gyro resonator 22 to be inferred from the magnitude of the drive signal 48. In some embodiments the drive function 128 is characterized by a local minima or saddle point 134. On either side of the saddle point 134, there is a non-unique temperature 130 for a given drive voltage 132. Accordingly, the utility of the drive function 128 may be applicable over a limited range of temperatures for piezoelectric gyro resonators, as explained below.

Figure 8:
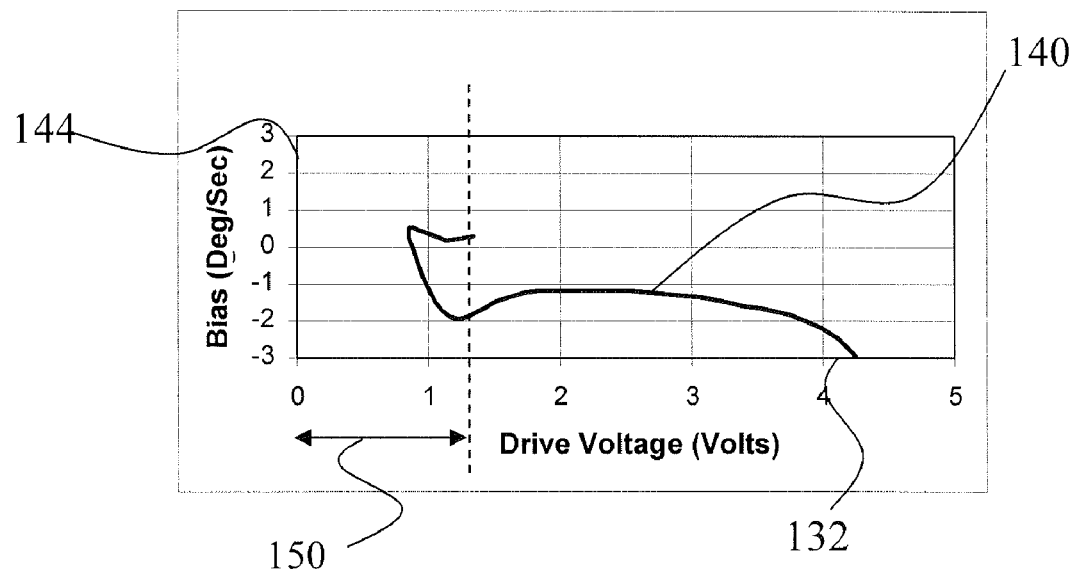
FIG. 8 is a representative bias error versus drive voltage graph in an embodiment of invention.
Figure 9:
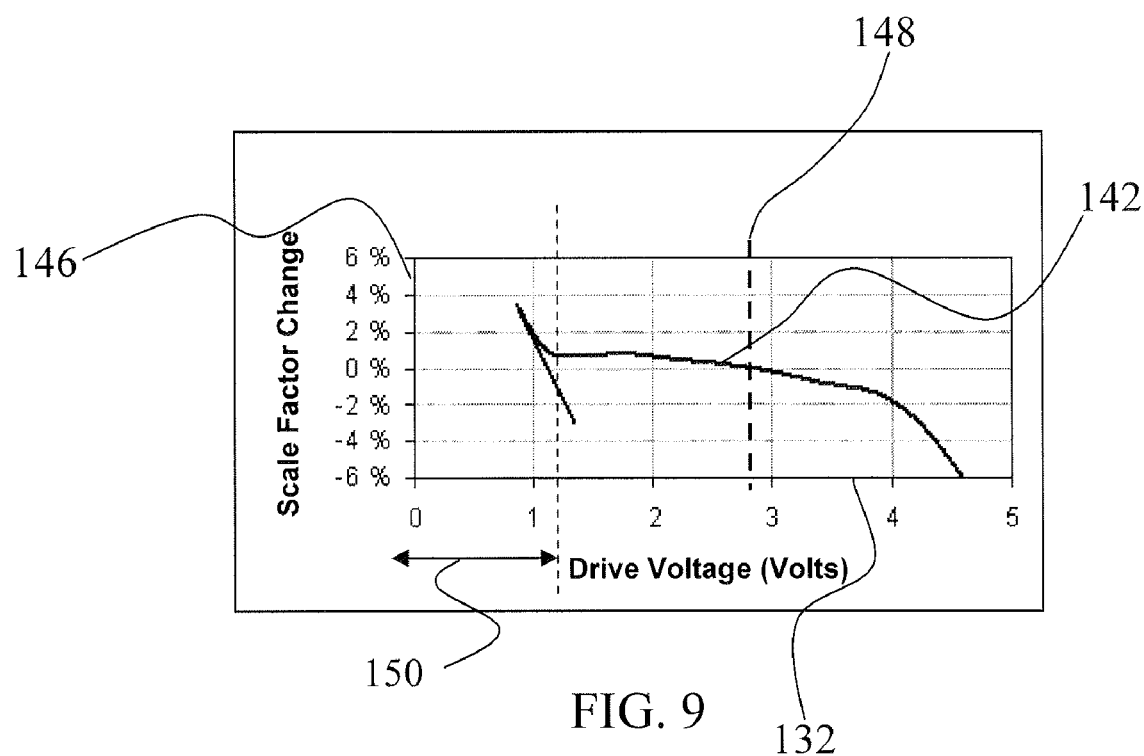
FIG. 9 is a representative scale factor change versus drive voltage graph in an embodiment of the invention.

Referring to FIGS. 8 and 9, a temperature dependent bias vs. drive voltage relationship 140 and a temperature dependent scale factor vs. drive voltage relationship 142 are graphed, respectively, versus the drive voltage 132 of the piezoelectric gyro resonator 22 in embodiments of the invention. The relationships 140 and 142 may be constructed using methods akin to the construction of FIGS. 5 and 6. That is, the drive function 128 of FIG. 7 can be utilized to assign or map the drive voltages 132 to the temperatures 130, thus enabling transformation of the drive voltage 132 as an indication of a false rotation rate or rotation rate bias 144 and a scale factor change or error 146. Alternatively, the temperature dependent bias vs. drive voltage relationship 140 (or other suitable indicia of the drive signal or drive power) and the temperature dependent scale factor vs. drive voltage relationship 142 may be obtained by direct calibration, thus precluding the need for the transformation.

The false rotation rate or rotation rate bias 144 may be presented in terms of an angular rate (e.g. degrees per second), as depicted in FIG. 8. The scale factor change or error 146 may be presented in terms of a percent change (as depicted in FIG. 9) in relation to a calibration reference point 148.

Functionally, the temperature dependent bias vs. drive voltage relationship 140 of FIG. 8 may be utilized to correct a false component of rotation that adds to or subtracts from the true rotation rate as the drive voltage 132 changes. Likewise, the temperature dependent scale factor vs. drive voltage relationship 142 of FIG. 9 may be implemented for correction of the scale factor as a function of drive voltage.

The graphs of FIGS. 8 and 9 also illustrate the limited utility of the drive function 128 for various embodiments of the invention. For the examples of piezoelectric gyro resonators presented herein, the drive voltage vs. temperature bias function 138 is characterized by a zone of ambiguity 150 within which the drive voltage 132 is representative of more than one solution. The zone of ambiguity is also depicted on FIG. 7 portraying the drive function 128, from which the ambiguity is derived. For example, the drive voltage of 1 volt in FIG. 8 is representative of both −1.1 degrees per second and +0.3 degrees per second (approximate). Accordingly, the temperature dependent bias vs. drive voltage relationship 140 and the temperature dependent scale factor vs. drive voltage relationship 142 standing alone may have a limited range of utility. In the case of the piezoelectric gyro resonators characterized in this work, using the drive voltage 132 as an input or operand is limited to gyro resonator temperatures of less than approximately −12 Celsius.

The foregoing descriptions present numerous specific details that provide a thorough understanding of various embodiments of the invention. It will be apparent to one skilled in the art that various embodiments, having been disclosed herein, may be practiced without some or all of these specific details. In other instances, known components have not been described in detail in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention.

For purposes of interpreting the claims for the present invention, it is expressly intended that the provisions of Section 112, sixth paragraph of 35 U.S.C. are not to be invoked with respect to a given claim unless the specific terms "means for" or "step for" are recited in that claim.

What is claimed is:

1. A method for correcting thermally induced error in a gyroscope system, said gyroscope system including a monolithic vibrating structure, a drive element operatively coupled with said monolithic vibrating structure for generation of a vibration pattern on said monolithic vibrating structure, said drive element being driven by a drive source, a feedback element operatively coupled with said monolithic vibrating structure for detection of a resonant frequency of said monolithic vibrating structure, said resonant frequency of said monolithic vibrating structure being temperature dependent, the method comprising:
   providing a first calibration, said first calibration establishing an operating characteristic of said gyroscope system as a function of the temperature of said monolithic vibrating structure of said gyroscope system;
   providing a second calibration, said second calibration establishing an error function of said gyroscope system as a function of the temperature of said monolithic vibrating structure of said gyroscope system;
   measuring said operating characteristic of said monolithic vibrating structure;
   inferring a temperature of said monolithic structure from said first calibration based on said operating characteristic;
   inferring an error value of said error function corresponding to said temperature of said monolithic structure from said second calibration; and
   automatically correcting said rotation rate based on said error value inferred from said temperature of said monolithic structure.

2. The method of claim 1 wherein said monolithic vibrating structure is a piezoelectric gyro resonator.

3. The method of claim 1 wherein said operating characteristic is said resonant frequency of said monolithic vibrating structure.

4. The method of claim 1 wherein said operating characteristic is a drive voltage magnitude of said drive source.

5. The method of claim 1 wherein said error function is one of a temperature bias and a scale factor.

6. The method of claim 1 wherein said feedback element is a dedicated feedback element.

7. A method for correcting error in a rotational rate sensing system, comprising:
   providing a gyroscope system including a monolithic vibrating structure, a drive element operatively coupled with said monolithic vibrating structure for generation of a vibration pattern on said monolithic vibrating structure, said drive element being driven by a drive source, a feedback element operatively coupled with said monolithic vibrating structure for detection of a resonant frequency of said monolithic vibrating structure, said resonant frequency of said monolithic vibrating structure being temperature dependent, the method comprising:
   providing a calibration establishing an error function as a relationship between said rotation rate and an operating characteristic of said gyroscope system;
   measuring said operating characteristic of said monolithic vibrating structure;
   determining an error value of said rotation rate from said operating characteristic; and
   automatically correcting said rotation rate based on said error value determined from said operating characteristic of said monolithic structure.

8. The method of claim 7 wherein said monolithic vibrating structure of said step of providing said gyroscope is a piezoelectric gyro resonator.

9. The method of claim 7 wherein said operating characteristic is said resonant frequency of said monolithic vibrating structure.

10. The method of claim 7 wherein said operating characteristic is a drive voltage magnitude of said drive source.

11. The method of claim 7 wherein said error function is one of a temperature bias and a scale factor.

12. The method of claim 7 wherein said feedback element of said step of providing said gyroscope is a dedicated feedback element.

13. A gyroscope system assembly comprising:
   a monolithic vibrating structure;
   a drive element operatively coupled with said monolithic vibrating structure for generation of a vibration pattern on said monolithic vibrating structure;
   a drive source operatively coupled with said drive element;
   a feedback element operatively coupled with said monolithic vibrating structure for detection of a resonant frequency of said monolithic vibrating structure, said resonant frequency of said monolithic vibrating structure being temperature dependent;
   an output processor operatively coupled with said feedback element, said output processor including a signal conditioner, an A/D converter and an electronic data storage medium operatively coupled with a microprocessor, said electronic data storage medium including calibration data establishing a relationship between an error of said rotation rate and an operating characteristic of said gyroscope system, said electronic data storage medium further including a set of programmed instructions executable by said microprocessor that cause said output processor to:
      obtain said operating characteristic of said monolithic vibrating structure;
      determine an error value of said rotation rate from said operating characteristic; and
      correct said rotation rate based on said error value determined from said operating characteristic of said monolithic structure.

14. The assembly of claim 13 wherein said monolithic vibrating structure is a piezoelectric gyro resonator.

15. The assembly of claim 13 wherein said operating characteristic is said resonant frequency of said monolithic vibrating structure.

16. The assembly of claim 13 wherein said operating characteristic is a drive voltage magnitude of said drive source.

17. The assembly of claim 13 wherein said error is one of a temperature bias and a scale factor.

18. The assembly of claim 13 wherein said feedback element of said step of providing said gyroscope is a dedicated feedback element.

19. A gyroscope system assembly comprising:
   a monolithic vibrating structure;
   a drive element operatively coupled with said monolithic vibrating structure for generation of a vibration pattern on said monolithic vibrating structure;
   a drive source operatively coupled with said drive element;
   a feedback element operatively coupled with said monolithic vibrating structure for detection of a resonant frequency of said monolithic vibrating structure, said resonant frequency of said monolithic vibrating structure being temperature dependent;
   an output processor operatively coupled with said feedback element, said output processor including a signal conditioner, an A/D converter and one of an application specific integrated circuit and a field programmable gate array including calibration data establishing a relationship between an error of said rotation rate and an operating characteristic of said gyroscope system and causing said output processor to:
      obtain said operating characteristic of said monolithic vibrating structure;
      determine an error value of said rotation rate from said operating characteristic; and
      correct said rotation rate based on said error value determined from said operating characteristic of said monolithic structure.

20. The assembly of claim 19 wherein said monolithic vibrating structure is a piezoelectric gyro resonator.

* * * * *